United States Patent Office 2,875,047

Patented Feb. 24, 1959

2,875,047

PHOTOPOLYMERIZATION WITH THE FORMATION OF COHERENT PLASTIC MASSES

Gerald Oster, New York, N. Y.

No Drawing. Application January 19, 1955
Serial No. 482,868

41 Claims. (Cl. 96—35)

This invention relates to photopolymerization with the formation of coherent plastic masses. The invention more particularly relates to the polymerization of polymerizable vinyl compounds using visible light as the polymerization initiator and with the formation of coherent plastic masses or bodies.

It has been proposed to effect the polymerization of vinyl compounds using electromagnetic radiation as the polymerization initiator and employing sensitizers, such as peroxides, halogenated alkyl aromatic compounds, diketone compounds, azonitriles, etc. With the use of these sensitizers, visible light is not effective as the polymerization initiator, and the higher energy shorter wavelength radiations, as, for example, ultraviolet light, are required.

In my co-pending application, Serial No. 482,867, filed on the same day, a process is described for effecting the polymerization of polymerizable vinyl compounds, such as vinyl monomers, using visible light as the polymerization initiator. In accordance with the said application, a solution containing the vinyl monomer, a photo-reducible dye, and a reducing agent, and preferably in the presence of oxygen, is subjected to irradiation with visible light, causing the formation of the polymer. The photo-reducible dye and the reducing agent should form a system which is stable in the absence of light, but which undergoes reduction of the dye in the presence of light.

In accordance with the said application, the polymer formed upon the photopolymerization is insoluble in the starting solution and precipitates out in the form of a divided material or product. Thus, for example, when acrylonitrile in aqueous solution with rose bengale and a mild reducing agent, such as ascorbic acid, is subjected to irradiation with visible light in the presence of atmospheric oxygen, the polymer formed precipitates out as an insoluble powder, and it is not possible to directly form a usable, coherent, plastic mass or body, as, for example, a film or coating, a shaped, plastic body, a hardened bonding cement, etc.

One object of this invention is the polymerization of polymerizable vinyl compounds using visible light as the polymerization initiator, and with the formation of a coherent, plastic mass, so that films or coatings, shaped, plastic bodies, hardened bonding cements, and the like, may be directly formed upon the polymerization.

A further object of this invention is a stable solution containing a polymerizable vinyl compound which will polymerize upon exposure to light.

A still further object of this invention is a process for photo-reproduction and copying, utilizing the photopolymerization of polymerizable vinyl compounds.

A still further object of this invention is a photosensitive emulsion for photography and photo-reproduction purposes, containing a polymerizable vinyl compound, which polymerizes upon exposure to light.

A still further object of this invention is a novel, high-molecular, polyacrylamide formed by the photopolymerization of acrylamide. These, and still further objects will become apparent from the following description:

In accordance with the invention, I have discovered that if the liquid system containing a polymerizable vinyl compound, a photo-reducible dye, a mild reducing agent, and preferably oxygen, comprises a solvent for the polyvinyl compound formed upon polymerization of the polymerizable vinyl compound, a coherent, plastic mass will form in place of the divided precipitate, such as the powdered precipitate previously obtained. The term "coherent, plastic mass," as used herein, is intended to designate materials ranging from viscous liquids to hard, rigid bodies. If the mass produced is to be rigid, it is preferable that the solution contain at least 20% by weight of the polymerizable vinyl compound.

The starting vinyl compound may comprise any of the known polymerizable organic vinyl compounds, and preferably polymerizable vinyl monomers, such as acrylonitrile, methacrylonitrile, methacrylic acid, acrylic acid, acrylamide, methacrylamide, vinylpyrollidone, vinyl acetate, methyl methacrylate, methyl acrylate, and styrene.

The dyes which may be used in accordance with the invention comprise any known dyes which are capable of forming a stable system with a reduction agent in the absence of light, but which will undergo reduction when irradiated with visible light in the presence of the reducing agent. These dyes includes rose bengale, phloxine, erythrosine, eosin, fluorescein, acriflavine, rhodamine B, methyl violet, brilliant green, thionine, methyl orange, riboflavin, water-soluble, and fat-soluble chlorophylls, hematoporphyrin, etc.

A large number of these dyes are characterized by their fluorescence.

The reducing agents which may be used in accordance with the invention comprise any known reducing agents which, in combination with the particular dye in question, will form a stable system in the absence of light, but which will cause reduction of the dye upon irradiation with visible light. The reduction potential of the reducing agent should therefore be less than that necessary to reduce the particular dye in question in the absence of visible light. These reducing agents will be referred to herein and in the claims as mild reducing agents, and include, for example, stannous chloride, ascorbic acid, glutathione, hydroxylamine, hydrazine, phenyl hydrazine, dichlorphenyl hydrazine, thiourea, allyl thiourea, etc.

When the starting compound constitutes a reducing agent itself for the particular dye in question when irradiated with visible light, as, for example, in the case of acrylamide and riboflavin, the presence of an additional reducing agent is not necessary, though the same may enhance the speed of the polymerization.

The polymerization is preferably effected in the presence of oxygen, such as the ambient atmosphere. It has been found that polymerization proceeds substantially more rapidly in the presence of this oxygen than when a portion of the inherently present oxygen has been removed from the polymerization solution.

The vinyl compound, dye, and reducing agent should be present in a true liquid system, i. e., in the form of a true solution. As mentioned, in order to form the coherent, plastic mass, the vinyl compound should preferably be present in amount of at least 20% by weight of the solution, and the solution must constitute a solvent for the polyvinyl compound formed upon the polymerization of the starting vinyl compound. In the case where the vinyl monomer is liquid and constitutes a solvent for the vinyl polymer, as, for example, in the case of styrene, no additional solvent is necessary.

When, however, the starting vinyl monomer is not in liquid form, as, for example, in the case of acrylamide, or where the monomer does not constitute a solvent for the polymer, as, for example, in the case of acrylonitrile, it is necessary to use an extra solvent, in which the vinyl polymer is soluble. Thus, for example, in the case of acrylonitrile, a zinc chloride solution may be used as a solvent, and in the case of acrylamide, water may be used as the solvent.

The amount of solvent used is not critical, and the minimum operable amount need only be sufficient to form a true liquid solution of all of the components. Amounts of solvent up to about 90% and more of the entire solution may be used, though it is preferable if the amount of solvent does not exceed to about 65% of the solution.

While the concentration of the dye in the solution is not critical, the most efficient results are obtained where the concentration is adjusted, so that at least about 95% of the incident light striking the solution and having a wave length corresponding to the absorption maximum of a particular dye, is absorbed.

Similarly, the amounts of reducing agent are not critical and amounts from about 0.01% by weight to the maximum solubility of the reducing agent in the solution have proven effective.

In the case of certain dyes which are acid-sensitive, as, for example, riboflavin, and when using an acid-reducing agent, it may be necessary to buffer the solution, as, for example, with a phosphate buffer, to obtain a neutral pH.

In order to effect the polymerization, the system is merely irradiated with visible light, i. e., light having a wave length between about 400 and 760 millimicrons.

Actually, it is only necessary to irradiate with the wave length for which the particular dye in question has a maximum absorption. Since, by very definition, the dye is a colored substance, this wave length of maximum absorption will always be in the visible light range. Therefore, in all cases it is merely necessary to irradiate with visible light.

The solution may, of course, contain several vinyl compounds and/or reducing agents.

Upon the irradiation the vinyl compound proceeds to polymerize, forming a coherent plastic mass. The viscosity of the mass is dependent upon the degree of polymerization and is proportional to the amount of the vinyl compound in the starting solution.

The complete polymerization proceeds extremely rapidly, as, for example, in the course of several minutes, or even several seconds, depending upon the intensity or the like, and no heat or pressure is required.

The rate of polymerization is roughly proportional to the intensity of the light absorbed by the dye, and the degree of polymerization to the amount of light absorbed by the dye.

In order to obtain a more resistant plastic, as, for example, a water-insoluble plastic, in the case of normally water-soluble polymers, such as methacrylic acid, acrylic acid, acrylamide, methacrylamide, vinyl pyrollidone, etc., and in order to obtain a plastic which is more resistant to solvents in any case, it has been found preferable to add a cross-linking agent to the starting solution.

Any of the conventionally known cross-linking agents which will join the linear polymer chains may be used. These cross-linking agents contain at least two reactive polymerization groups in the molecule and include, for example, N,N-diallylmelamine, N,N'-methylbisacrylamide, triallyl cyanurate, divinyl benzene, etc.

The cross-linking agent may be present in any amount up to its maximum solubility in the solution, and the greater the amount of the cross-linking agent, the more solvent-resisting will be the plastic body.

It has further been found preferable to add a compound which will reduce the rate of termination of the polymerization reaction, and thus increase the speed of the polymerization. For this purpose a low-molecular weight thickening agent which will increase the viscosity of the solution may be used. Low-molecular weight polyhydroxy organic compounds, such as glycerol, sucrose and dextrose have proven preferable. These compounds may be present in any amount up to their maximum solubility in the solution.

The process in accordance with the invention is applicable in any case where it is desirable to produce a coherent, plastic mass in situ. Thus, for example, the starting solution containing the polymerizable vinyl compound, the reducing agent, the dye, and, preferably the cross-linking agent, and, further, preferably containing the viscosity-increasing glycerol, sucrose or dextrose, may be used as a bonding cement for the bonding of materials which hardens upon being subjected to visible light. The solution may thus, for example, be applied between two plates of glass which are pressed together. When light is shone through the glass, the polymerization proceeds and the coherent plastic mass formed bonds two plates of glass together.

The solution may, of course, also be used for bonding any other materials where it is possible to subject the solution to irradiation with visible light. The solution thus may be applied to bond glass to an opaque backing or to bond two opaque bodies together where sufficient light may be admitted between the joint.

In connection with bonding two bodies where it it not possible to irradiate the bonding solution with visible light after the bodies are placed together in joining position, the solution may be applied to one of the bodies, strongly irradiated with light, and the other body quickly pressed in place prior to the setting of the solution. Alternately, a material which fluoresces with visible light when irradiated with shorter wave lengths, as, for example, powdered anthracene, may be incorporated in the solution and after the bodies are positioned in place, the same may be irradiated with shorter radiation, such as X-rays or gamma rays, which will penetrate the body, causing irradiation of the fluorescent material generating the visible light for setting the bonding solution.

The starting solutions may also be used for the production of films and coatings which are rapidly cured by visible light or for a potting compound for embedding parts therein or a molding compound for molding shaped plastic bodies. No heat or pressure is required for the formation of the plastic mass, and visible light is the only physical agent necessary as the initiator.

For all these uses, the starting material is merely applied in the conventional manner, and thereafter set by irradiation with visible light.

The starting solutions are also excellently suited for coating or impregnating materials, such as paper, leather, fibers, or fabrics. The solutions are merely applied to these materials and thereafter cured by irradiating with visible light. Fabrics, for example, may be impregnated with the starting solution in order to water-proof or impart crease-resistance to the same. The degree of impregnation may be very accurately controlled by adjusting the viscosity of the starting solution, as, for example, by increasing the same by partial polymerization caused by visible light irradiation for a short period. The setting of the solution after impregnation is only effected by irradiation with visible light, so the same may be very accurately controlled and need not be initiated until the impregnation of the fabric with the solution is effected in the manner exactly desired. In this manner, for example, the impregnation may be effected without clogging the pores, etc.

The starting solutions may also be used in place of the conventional resins for reinforcing materials with fiber glass cloth or producing articles from laminated fiber glass cloth. In this connection the starting solutions are applied in the same manner as the conventional resins and thereafter set by merely irradiating with visible light.

The solutions themselves are extremely stable in the absence of visible light, and thus may be prepared and stored for long periods of time, as, for example, in opaque containers or brown bottles.

The polymerization in accordance with the invention may lead to the formation of polyvinyl compounds having extremely high molecular weight. Certain of the more soluble of these polyvinyl compounds, as, for example, acrylamide, are excellently suited as thickening agents.

In the case of the polymerization of the acrylamide in accordance with the invention, a polyacrylamide, having a molecular weight higher than that hithertofore obtainable, is produced. The molecular weight of this polyacrylamide exceeds 1,000,000 and may run into the hundreds of millions. This high molecular weight polyacrylamide constitutes a novel material, and is, for example, excellently suited as a thickening agent.

The invention is particularly suitable for the production of photosensitive emulsions, printing plates, such as lithographic plates, or for other photo-copying purposes. For this purpose, the starting solution should contain the cross-linking agent, preferably in amount of at least 0.1%, and should preferably contain at least 20% by weight of the vinyl compound.

In order to produce a printing plate, for example, the starting solution is poured on a backing plate, such as a glass or metal plate, and is irradiated, for example, through a photographic negative or some other means with visible light. The plate is then washed with water to remove the unirradiated portions, which have not been polymerized and are thus still soluble. The remaining plate has the true photographic reproduction thereon in relief. This relief may then be inked, pressed to a paper, or an off-set roller, and the image will be produced on the paper. The affinity for the ink is also related to the degree of polymerization and thus an extremely true and accurate reproduction can be made. The photo-image has a higher affinity for most inks than has the metal or glass backing. The method is suitable for line copying and also for half-tone and for continuous tone prints. Furthermore, the photo-image is more resistant to the action of acids than is a copper backing, and hence can be used for photo-engraving.

The solutions may also be used for forming photo-images in relatively high relief, which are excellently suited for display purposes. In order to achieve this effect, it is merely necessary to apply a greater depth of the starting solution to the backing. Thus, for example, the solution may be poured into a tray having a glass bottom and irradiated by projecting the image through the glass onto the solution.

The method in accordance with the invention is superior to other photo-reproduction processes, such as the bichromate process or the diazoplate process, in that only visible light is used and the ulttra violet light of the prior art is not required. Thus, in accordance with the invention, only a tungsten lamp is required as contrasted to the mercury arc or carbon arc of the prior art.

Further, the method in accordance with the invention involves the initiation of a chain polymerization reaction rather than merely a primary photochemical reaction as in the prior art. As a result of this, the process is at least 100 times faster than the prior art, using the same light intensity.

The starting solution, containing the cross-linking agent, may also be used as a photosensitive emulsion in the place of any of the prior-known photosensitive emulsions, as for example, standard photographic film, plates, or printing paper. For this purpose it is merely necessary to apply the solution to a suitable backing, as, for example, any conventional photographic backing, such as a glass plate, paper backing, plastic backing, etc. It is preferable if the solution is held in place on the backing by a suitable material such as gelatine. For this purpose it is also possible to thicken the solution as, for example, by partial polymerization.

After the exposure of the emulsion incorporating the solution in accordance with the invention, no chemical developing steps are necessary, and it is merely necessary to wash the exposed emulsion with a solvent for the final monomer, as, for example, water. The emulsion, after the washing, may be used for direct printing by merely inking the same by pressing against a suitable surface, such as paper, either directly or through an off-set roller or plate.

In the case of photosensitive emulsions which are intended for photographic use in cameras, the solution should contain at least three dyes, each having an absorption maximum for a different one of the three primary colors. Thus, for example, acriflavine, rose bengale, and brilliant green may be used as the dyes in the emulsion.

For color photography, a three-plate system may be used, as, for example, in a standard, one-shot, three-color camera. Each of the emulsions should incorporate a different dye which absorbs a different one of the primary colors. Thus, for example, one of the emulsions may contain acriflavine, the other rose bengale, and the third brilliant green as the dye material.

The invention is further applicable to form dot images on color television tubes. Thus, for example, the starting solution is mixed with appropriate phosphors and applied to a glass plate. A dot pattern is then projected on the plate, and after this irradiation the plate is washed with water and the phosphor pattern remains on the plate.

The following examples are given by way of illustration and not limitation:

*Example 1*

An aqueous solution containing 10% by weight acrylamide and 0.005% by weight riboflavin is irradiated with a half kilowatt tungsten filament projector lamp placed 10 inches from the sample. The solution is transformed into a coherent mass containing high-molecular weight polyacrylamide. The molecular weight of the polymer exceeds 8,000,000, and the solution is excellently suited as a thickening agent.

*Example 2*

A solution containing one part acrylonitrile by weight, one part of an 80% zinc chloride solution, .001% by weight acriflavine, .01% acidified stannous chloride having a pH of 1 was irradiated with a tungsten lamp. A hard, clear, plastic body of polyacrylonitrile formed.

*Example 3*

Example 2 was repeated, but the irradiation with the visible light was terminated when the starting solution had a viscosity roughly corresponding to that of honey. The viscous solution was then extruded under tension into water and polyacrylonitrile filament threads of high quality were formed.

*Example 4*

A solution having the following constituents was formed:

| | Grams |
|---|---|
| (1) Acrylamide | 30 |
| (2) N,N'-methylenebisacrylamide | 0.5 |
| (3) Allylthiourea | 1 |
| (4) Riboflavin | 0.01 |
| (5) Glycerol | 50 |
| (6) Water to make up to 100 milliliters of solution. | |

A portion of the solution was placed between two glass plates and irradiated with visible light. The two glass plates become firmly cemented together and would not loosen, even when immersed in water.

If the solution is to be used to bond two opaque bodies, so that the same cannot be irradiated, a material such as powdered anthracene which fluoresces visible light upon irradiation with shorter wave lengths, such as X-rays or gamma rays, may be incorporated in the solution. The opaque bodies may then be irradiated with X-rays which pass through the same, causing visible fluorescence of the material in the solution and thus the polymerization of the vinyl compound setting of the solution, forming a firm bond.

*Example 5*

A solution corresponding to the solution of Example 4 was mixed with clean beach sand and irradiated. The particles of sand were cemented together to give a concrete-like material suitable for construction purposes. If the liquid is placed at the junction of two materials, such as paper, wood, or glass, and if the junction is irradiated, a firm bond is formed. The solution can thus be used to cement fibers, wood pulp, to form coated textiles and reinforced paper board, etc.

*Example 6*

The mixture of Example 4 was poured on a glass plate and irradiated through a photographic negative with visible light. The plate was then washed with water to remove the unirradiated and polymerized portions. The remaining relief was then inked and pressed to a paper, and an extremely high-quality, true reproduction print was produced.

*Example 7*

To pure styrene were added the following compounds (with their final percentages): divinylbenzene (1.0%), dichlorphenylhydrazine (0.5%), fat-soluble chlorophylls (0.005%), and an irradiation with light from a 500 watt tungsten lamp at a distance of 20 centimeters gave a hard plastic body.

This example was repeated, except that styrene was replaced by vinyl acetate, methyl methacrylate, and methylacrylate, respectively, and comparable results were obtained.

The example was again repeated with the divinylbenzene, replaced by triallylcyanurate, and comparable results were obtained.

*Example 8*

The following solutions were made up:

A. The solution of Example 4 with the acrylamide replaced by methacrylamide, vinyl pyrollidone, and acrylic acid, respectively.

B. The solution of Example 4 with the N,N′-methylenebisacrylamide replaced by calcium acrylate, by N,N′-diallylmelamine.

C. The solution of Example 4 with the riboflavin and allylthiourea replaced by the dye-reducing agent combinations: rose bengale and thiourea, phloxine and ascorbic acid, erythrosine and glutathione, acriflavine and acidified stannous chloride, fluorescein and hydroxylamine, hematoporphyrine and hydrazine, respectively.

D. The solution of Example 4 with the glycerol replaced by sucrose and dextrose, respectively.

The solutions were each separately irradiated with visible light and a hard, solid, coherent, plastic body formed.

Examples 5 and 6 were repeated, using these solutions in place of the solution of Example 4 and comparable results were obtained.

*Example 9*

A dry powdered mixture was made up of the following constituents:

| Substance: | Percentage by weight of total powdered mixture |
|---|---|
| (1) Calciumacrylate | 0–5 |
| (2) Riboflavin | 0.001–1.0 |
| (3) Allylthiourea | 0–1 |
| (4) Dextrose | 0–20 |
| (5) Remainder consisting of acrylamide. | |

When this powder is dissolved in an amount of water ranging from the amount necessary to completely dissolve the same up to 80% by weight, a solution is formed which constitutes an excellent coating material, cement, potting or molding compound, etc., which will set on irradiation with visible light.

The acrylamide may be replaced by methacrylamide, and the cross-linking agent, dye, reducing agent, and thickening agent may be replaced by any of these materials as set forth supra, which may be obtained in dry powdered form.

*Example 10*

The following mixture was made up:

| | Grams |
|---|---|
| (1) Methacrylamide | 35 |
| (2) N,N′-diallylmelamine | 0.3 |
| (3) Rose bengale | 0.01 |
| (4) Phenylhydrazine hydrochloride | 1 |
| (5) Glycerol | 50 |
| (6) Gelatine | 5 |
| (7) Water to make up to 100 milliliters of solution. | |

The solution was heated to 50° centigrade to dissolve the gelatine, and poured on to a glass plate. The gelatine film containing the imbibed mixture was irradiated through a photographic negative with visible light. The plate was then soaked in water to remove soluble gelatine and unirradiated material, and dried. The remaining relief was then inked and pressed to a paper to give a reproduction print.

*Example 11*

A mixture as given in Example 9 was made, but in addition to rose bengale, two more dyes were added, namely acriflavine (0.01 gram) and brilliant green (0.01 gram) and the plate was made up as described in Example 9.

A photograph of a well-illuminated subject was taken in a bellows-type camera using this plate as the photographic plate. The exposed plate was then soaked in water and dried. The image was inked with black ink, forming a picture of the original subject.

*Example 12*

Three individual plates were made up as in Example 10, excepting that in the first plate the dye is acriflavine, in the second plate the dye is rose bengale, and in the third plate the dye is brilliant green. The plates were then introduced into a one-shot, three-color camera, and a picture was taken of a well-illuminated, colored subject. After soaking in water and then drying, the first plate was inked with a blue ink, the second with a green ink, and the third with a red ink and successively pressed against a single sheet of paper. The resulting image on the paper is a color reproduction of the original subject.

*Example 13*

A viscose rayon fabric was impregnated with the solution of Example 4 by dipping the same into a container of the solution. The fabric was then removed from the solution and the excess impregnating agent removed by gently pressing the cloth between rubber rollers. The entire operation up to this point was effected in the absence of light. Thereafter, the fabric was stretched out and irradiated with a tungsten lamp. The fabric was imparted excellent moisture- and crease-resistant properties.

I claim:

1. Process for the polymerization of vinyl monomers for the production of coherent masses which comprises irradiating with visible light, a liquid solution containing at least 20% by weight of a vinyl monomer polymerizable to a solid soluble polymer, an organic photoreducible dye and a reducing agent having a reduction potential incapable of reducing said dye in the absence of light but of sufficient strength to reduce the photo excited dye, said dye and reducing agent forming a stable system in the absence of light which undergoes reduction of dye upon exposure to visible light, said liquid solution comprising a solvent for said soluble vinyl polymer, said dye and reducing agent being present in sufficient amount to produce free radicals for the polymerization of said polymerizable vinyl monomers when irradiated with visible light, and thereby transforming said solution into a coherent mass.

2. Process according to claim 1, in which said solution contains a cross-linking agent.

3. Process according to claim 1, in which said solution contains a viscosity-increasing, low-molecular weight polyhydroxy organic compound.

4. Process according to claim 1, in which said photoreducible dye is a member selected from the group consisting of rose bengale, phloxine, erythrosine, eosin, fluorescein, acriflavine, rhodamine B, methyl violet, brilliant green, thionine, methyl orange, riboflavin, water-soluble and fat-soluble chlorophylls, and hematoporphyrin.

5. Process according to claim 1, in which said reducing agent is a member selected from the group consisting of stannous chloride, ascorbic acid, glutathione, hydroxylamine, hydrazine, phenyl hydrazine, dichlorphenyl hydrazine, thiourea, and allylthiourea.

6. Process according to claim 1, in which said photoreducible dye is a member selected from the group consisting of rose bengale, phloxine, erythrosine, eosin, fluorescein, acriflavine, rhodamine B, methyl violet, brilliant green, thionine, methyl orange, riboflavin, water-soluble and fat-soluble chlorophylls and hematoporphyrin, and in which said reducing agent is a member selected from the group consisting of stannous chloride, ascorbic acid, glutathione, hydroxylamine, hydrazine, phenyl hydrazine, dichlorphenyl hydrazine, thiourea, and allylthiourea.

7. Process according to claim 6, in which said solution contains a cross-linking agent.

8. Process according to claim 7, in which said cross-linking agent is a member selected from the group consisting of calcium acrylate, N,N-diallylmelamine, N,N'-methylbisacrylamide, triallyl cyanurate, and divinyl benzene.

9. Process according to claim 8, in which said polymerizable vinyl monomer is a vinyl monomer selected from the group consisting of acrylonitrile, methacrylonitrile, methacrylic acid, acrylic acid, acrylamide, methacrylamide, vinylpyrollidone, vinyl acetate, methyl methacrylate, methyl acrylate, and styrene.

10. Process according to claim 9, in which said irradiation is effected in the presence of oxygen.

11. Process according to claim 10, in which said irradiation is effected in the presence of the ambient atmospheric oxygen.

12. Process according to claim 11, in which said solution contains a member selected from the group consisting of glycerol, sucrose and dextrose.

13. Process according to claim 1, in which said irradiation is effected in the presence of oxygen.

14. Process according to claim 13, in which said irradiation is effected in the presence of the ambient atmospheric oxygen.

15. Process according to claim 1, in which said polymerizable vinyl monomer is a member of the group consisting of methacrylic acid, acrylic acid, acrylamide methacrylamide, and vinylpyrollidone, and in which said solution is an aqueous solution.

16. Process according to claim 15, in which said polymerizable vinyl compound is acrylamide.

17. Process according to claim 16, in which said solution contains a cross-linking agent.

18. Process according to claim 17, in which said solution contains a member selected from the group consisting of glycerol, sucrose, and dextrose.

19. Process according to claim 18, in which said cross-linking agent is a member selected from the group consisting of calcium acrylate, N,N-diallylmelamine, N,N'-methylbisacrylamide, triallyl cyanurate divinyl benzene.

20. Process according to claim 1, in which said polymerizable vinyl monomer is acrylonitrile and in which said solution is a zinc chloride solution.

21. Process according to claim 1, in which said reducing agent is present in amount ranging from about .001% by weight to the maximum solubility in the solution.

22. Process according to claim 1, in which said liquid solution has a pH of about 7.

23. Process according to claim 1, in which said dye is present in amount sufficient to absorb at least 85% of the incident light striking the solution in the wave length of its maximum absorption.

24. A liquid solution containing at least 20% by weight of a vinyl monomer polymerizable to a solid soluble polymer, an organic photo-reducible dye and a reducing agent having a reduction potential incapable of reducing said dye in the absence of light but of sufficient strength to reduce the photo-excited dye, said dye and reducing agent forming a stable system in the absence of light which undergoes reduction of the dye upon exposure to visible light, said liquid solution comprising a solvent for said soluble vinyl polymer, said dye and reducing agent being present in sufficient amount to produce free radicals for the polymerization of said polymerizable vinyl polymer when irradiated with visible light.

25. A solution according to claim 24, additionally containing a cross-linking agent.

26. A solution according to claim 25, additionally containing a member selected from the group consisting of glycerol, sucrose, and dextrose.

27. A solution according to claim 24, in which said polymerizable vinyl monomer is a member selected from the group consisting of acrylonitrile, methacrylonitrile, methacrylic acid, acrylic acid, acrylamide methacrylamide, vinylpyrollidone, vinyl acetate, methyl methacrylate, methyl acrylate, and styrene, said photoreducible dye being a member selected from the group consisting of rose bengale, phloxine, erythrosine, eosin, fluorescein, acriflavine, rhodamine B, methyl violet, brilliant green, thionine, methyl orange, riboflavin, water-soluble and fat-soluble chlorophylls, and hematoporphyrin, said reducing agent having a member selected from the group consisting of stannous chloride, ascorbic acid, glutathione, hydroxylamine hydrazine, phenyl hydrazine, dichlorphenyl hydrazine, thiourea, and allyl thiourea, and including a cross-linking agent selected from the group consisting of calcium acrylate, N-tertbutylacrylamide, N,N-diallylmelamine, N,N'-methylbisacrylamide, triallyl cyanurate, divinyl benzene.

28. A solution according to claim 27, additionally containing a member selected from the group consisting of glycerol, sucrose, and dextrose.

29. A solution according to claim 28, in which said polymerizable vinyl compound is acrylamide and in which said solution is an aqueous solution.

30. A zinc chloride solution containing at least 20% by weight of acrylonitrile, a photoreducible dye selected from the group consisting of rose bengale, phloxine, erythrosine, eosin, fluorescein, acriflavine, rhodamine B, methyl violet, brilliant green, methyl orange, riboflavin, water-soluble and fat-soluble chlorophylls, and hematoporphyrin, and a mild reducing agent selected from the group consisting of stannous chloride, ascorbic acid, glutathione, hydroxylamine, hydrazine, phenyl hydrazine, dichlorphenyl hydrazine, thiourea, allylthiourea.

31. A backing having a light sensitive solution thereon containing at least 20% by weight of a vinyl monomer polymerizable to a solid soluble polymer, an organic photo-reducible dye and a reducing agent having a reduction potential incapable of reducing said dye in the absence of light but of sufficient strength to reduce the photo-excited dye, said dye and reducing agent forming a stable system in the absence of light which undergoes reduction of the dye upon exposure to visible light, said liquid solution comprising a solvent for said soluble vinyl polymer, said dye and reducing agent being present in sufficient amount to produce free radicals for the polymerization of said polymerizable vinyl polymer when irradiated with visible light.

32. Backing according to claim 31, in which said polymerizable vinyl monomer is a member selected from the group consisting of acrylonitrile, methacrylonitrile, methacrylic acid, acrylic acid, acrylamide methacrylamide, vinylpyrollidone, vinyl acetate, methyl methacrylate, methyl acrylate, and styrene, said photoreducible dye is a member selected from the group consisting of rose bengale, phloxine, erythrosine, eosin, fluorescein, acriflavine, rhodamine B, methyl violet, brilliant green, thionine, methyl orange, riboflavin, water-soluble and fat-soluble chlorophylls, and hematoporphyrin, said mild reducing agent is a member selected from the group consisting of stannous chloride, ascorbic acid, glutathione, hydroxylamine, hydrazine, phenyl hydrazine, dichlorphenyl hydrazine, thiourea, allyl thiourea, etc., and said cross-linking agent is a member selected from the group consisting of calcium acrylate, N,N-diallylmelamine, N,N'-methylbisacrylamide, triallyl cyanurate, and divinyl benzene.

33. Backing according to claim 32, in which said solution additionally contains a member selected from the group consisting of glycerol, sucrose, and dextrose.

34. Backing according to claim 33, in which said solution is positioned on a backing.

35. Backing according to claim 34, in which said solution is in a gelatine.

36. A backing having a light sensitive aqueous solution thereon containing at least 20% by weight of acrylamide, a photo-reducible dye selected from the group consisting of rose bengale, phloxine, erythrosine, eosin, fluorescein, acriflavine, rhodamine B, methyl violet, brilliant green, thionine, methyl orange, riboflavin, water-soluble and fat-soluble chlorophylls, and hematoporphyrin, a reducing agent selected from the group consisting of stannous chloride, ascorbic acid, glutathione, hydroxylamine, hydrazine, phenyl hydrazine, dichlorphenyl hydrazine, thiourea, and allyl thiourea, and a cross-linking agent selected from the group consisting of calcium acrylate, N,N-diallylmelamine, N,N'-methylbisacrylamide, triallyl cyanurate, divinyl benzene.

37. Backing according to claim 36, in which said solution is embedded in a gelatine positioned on a backing.

38. Backing according to claim 37, in which said solution contains at least three individual photoreducible dyes selected from said group, each having an absorption for a different primary color.

39. Process according to claim 1, in which said polymerizable vinyl monomer comprises said mild reducing agent.

40. Process according to claim 1, in which said polymerizable vinyl monomer is acrylamide and in which said photoreducible dye is riboflavin.

41. Method for the impregnation of organic porous materials, which comprises impregnating the material with the solution according to claim 24, and thereafter irradiating with visible light.

References Cited in the file of this patent

UNITED STATES PATENTS

| | | |
|---|---|---|
| 1,433,806 | Sperati | Oct. 31, 1922 |
| 2,068,879 | Troland | Jan. 26, 1937 |
| 2,423,520 | Richards | July 8, 1947 |
| 2,448,828 | Renfrew | Sept. 7, 1948 |
| 2,486,190 | Minsk et al. | Oct. 25, 1949 |
| 2,521,902 | Coover et al. | Sept. 12, 1950 |
| 2,562,641 | Saunders | July 31, 1951 |
| 2,706,699 | Plansoen et al. | Apr. 19, 1955 |

OTHER REFERENCES

Oster: Photographic Engineering, vol. 4, No. 3 (1953), pp. 173–178.